US010552360B2

(12) United States Patent
Iwamoto

(10) Patent No.: US 10,552,360 B2
(45) Date of Patent: Feb. 4, 2020

(54) ELECTRONIC DEVICE, CONNECTION METHOD, AND STORAGE MEDIUM

(71) Applicant: TOSHIBA CLIENT SOLUTIONS CO., LTD., Koto-ku, Tokyo (JP)

(72) Inventor: Rinzo Iwamoto, Tokyo (JP)

(73) Assignee: Toshiba Client Solutions CO., LTD., Tokyo (JP)

(*) Notice: Subject to any disclaimer, the term of this patent is extended or adjusted under 35 U.S.C. 154(b) by 0 days.

(21) Appl. No.: 16/205,063

(22) Filed: Nov. 29, 2018

(65) Prior Publication Data

US 2019/0317913 A1 Oct. 17, 2019

(30) Foreign Application Priority Data

Apr. 17, 2018 (JP) .................................. 2018-079200

(51) Int. Cl.
| | | |
|---|---|---|
| G06F 13/40 | (2006.01) | |
| G06F 13/42 | (2006.01) | |
| G02B 27/01 | (2006.01) | |
| H04M 1/725 | (2006.01) | |
| G06F 11/30 | (2006.01) | |
| G06F 11/22 | (2006.01) | |

(52) U.S. Cl.
CPC ....... *G06F 13/4072* (2013.01); *G02B 27/017* (2013.01); *G06F 11/2221* (2013.01); *G06F 11/3041* (2013.01); *G06F 11/3051* (2013.01); *G06F 13/4282* (2013.01); *H04M 1/72527* (2013.01); *G02B 2027/0138* (2013.01)

(58) Field of Classification Search
CPC ............. G06F 11/2221; G06F 11/3041; G06F 11/3051; G06F 11/3055; G06F 13/4072; G06F 13/4282
See application file for complete search history.

(56) References Cited

U.S. PATENT DOCUMENTS

| | | | |
|---|---|---|---|
| 9,098,640 B2 | 8/2015 | Uehara | |
| 2005/0060490 A1* | 3/2005 | Lu | G06F 13/4081 711/115 |
| 2010/0042764 A1* | 2/2010 | Rodriguez | G06F 13/385 710/63 |
| 2016/0012000 A1* | 1/2016 | Paramasivam | G06F 13/102 710/10 |
| 2018/0060262 A1* | 3/2018 | Kim | G06F 13/102 |

FOREIGN PATENT DOCUMENTS

| | | |
|---|---|---|
| EP | 1100018 A2 | 5/2001 |
| JP | 2001-142796 A | 5/2001 |
| JP | 2002-244775 A | 8/2002 |
| JP | 2007-156921 A | 6/2007 |
| JP | 2013-045354 A | 3/2013 |
| JP | 2014-006726 A | 1/2014 |

\* cited by examiner

*Primary Examiner* — Glenn A. Auve
(74) *Attorney, Agent, or Firm* — Knobbe, Martens, Olson & Bear, LLP

(57) ABSTRACT

According to one embodiment, when an external device is connected, the electronic device detects devices in the external device, and setup of detected devices. When the electronic device is powered, when a power state is restored from a hibernation or a sleep state to a normal state, or when the external device is connected, it is determined whether a first device is included in the detected devices. When the first device is included and when setup of a second device is failed, detection of devices and setup of detected devices are repeated.

18 Claims, 13 Drawing Sheets

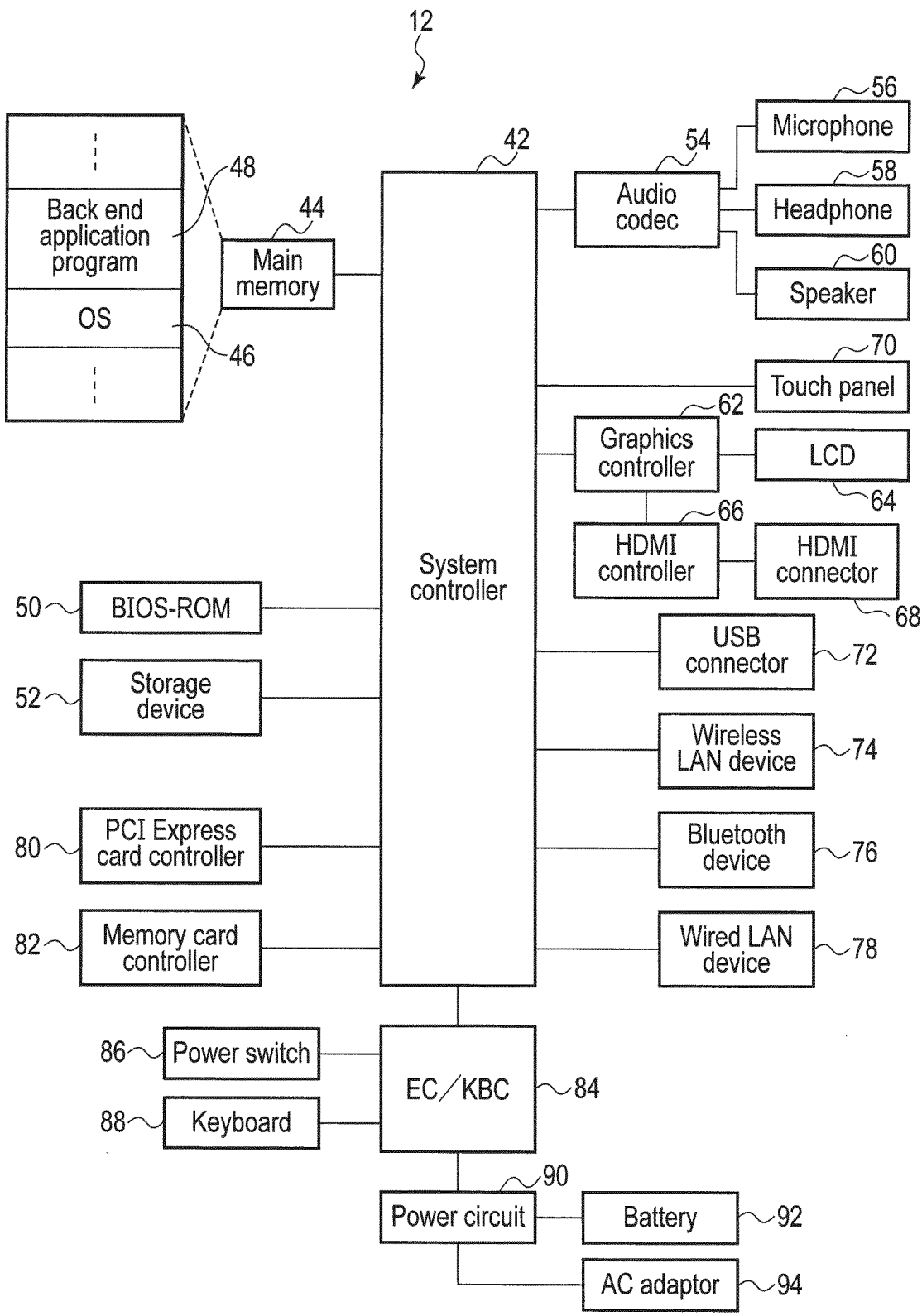
F I G. 2

| Function | Button operation | Power LED 213 | | |
|---|---|---|---|---|
| | | Emission color of the LED 213 | Lighting state of the LED 213 | Contents |
| Change in power state | Pressing the power switch 212 (one second) | White | Lighting (sleep) | Restoration |
| | | | Lighting (hibernation) | Power-on |
| | | | Lighting (power-off) | Power-on |
| | Simultaneously pressing the up button 202a and the power switch 212 (one second) | Turn off | Blinking | Transition to sleep state |
| | Simultaneously pressing the right button 202b and the power switch 212 (one second) | | — | Transition to hibernation state |
| | Simultaneously pressing the down button 202c and the power switch 212 (one second) | | — | Shutdown |

F I G. 9

| Device name | Success/failure in setup |
|---|---|
| USB hub 164 | Success |
| Light 118 | Success |
| Camera 116 | Failure |
| Camera LED 120 | Success |
| Microphones 112, 126 | Success |
| Speaker 130 | Success |
| Motion sensor 176 | Failure |
| Illuminance sensor 114 | Success |
| Proximity sensor 178 | Success |
| Buttons 102, 104, 106, 108 | Success |

FIG. 11

| Device name | Connection detection | Success/failure in setup |
|---|---|---|
| USB hub 164 | Detected | Success |
| Display 124 | Undetected | — |
| Light 118 | Detected | Success |
| Camera 116 | Detected | Failure |
| Camera LED 120 | Detected | Success |
| Microphones 112, 126 | Detected | Success |
| Speaker 130 | Detected | Success |
| Motion sensor 176 | Detected | Failure |
| Illuminance sensor 114 | Detected | Success |
| Proximity sensor 178 | Detected | Success |
| Touch pad 110 | Undetected | — |
| Buttons 102, 104, 106, 108 | Detected | Success |
| GPS sensor 180 | Undetected | — |

FIG. 13

ELECTRONIC DEVICE, CONNECTION METHOD, AND STORAGE MEDIUM

CROSS-REFERENCE TO RELATED APPLICATIONS

This application is based upon and claims the benefit of priority from Japanese Patent Application No. 2018-079200, filed Apr. 17, 2018, the entire contents of which are incorporated herein by reference.

FIELD

Embodiments described herein relate generally to an electronic device, to which an external device can be connected, a method of connecting the external device and electronic device to each other, and a storage medium.

BACKGROUND

An external device may be connected to an electronic device and, the electronic device may operate while using the external device. For example, a USB (registered trade mark) memory is connected to a USB connector of a personal computer (hereinafter also referred to a PC), and the PC writes data into the USB memory or the PC reads data from the USB memory. Upon detection of connection of an external device to the USB connector, the Operating System (OS) of the PC activates driver software corresponding to the detected device to thereby set up the external device so that the external device can be operable.

In recent years, a composite device provided with a USB hub and a plurality of devices in housing has been developed. Among the plurality of devices, a device or devices are unsuccessful in setup to be carried out by the OS. In such a case, it is necessary for the user to once unplug the composite device from the USB connector and insert the device again into the USB connector.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary structure of an operator terminal 12 in FIG. 1.

FIG. 9 shows an example of a power state of the mobile PC 16.

FIG. 11 shows an example of a device setup table created by the OS 314.

FIG. 13 shows an example of a device setup table to be used in the connection monitoring program.

DETAILED DESCRIPTION

Figure 1:
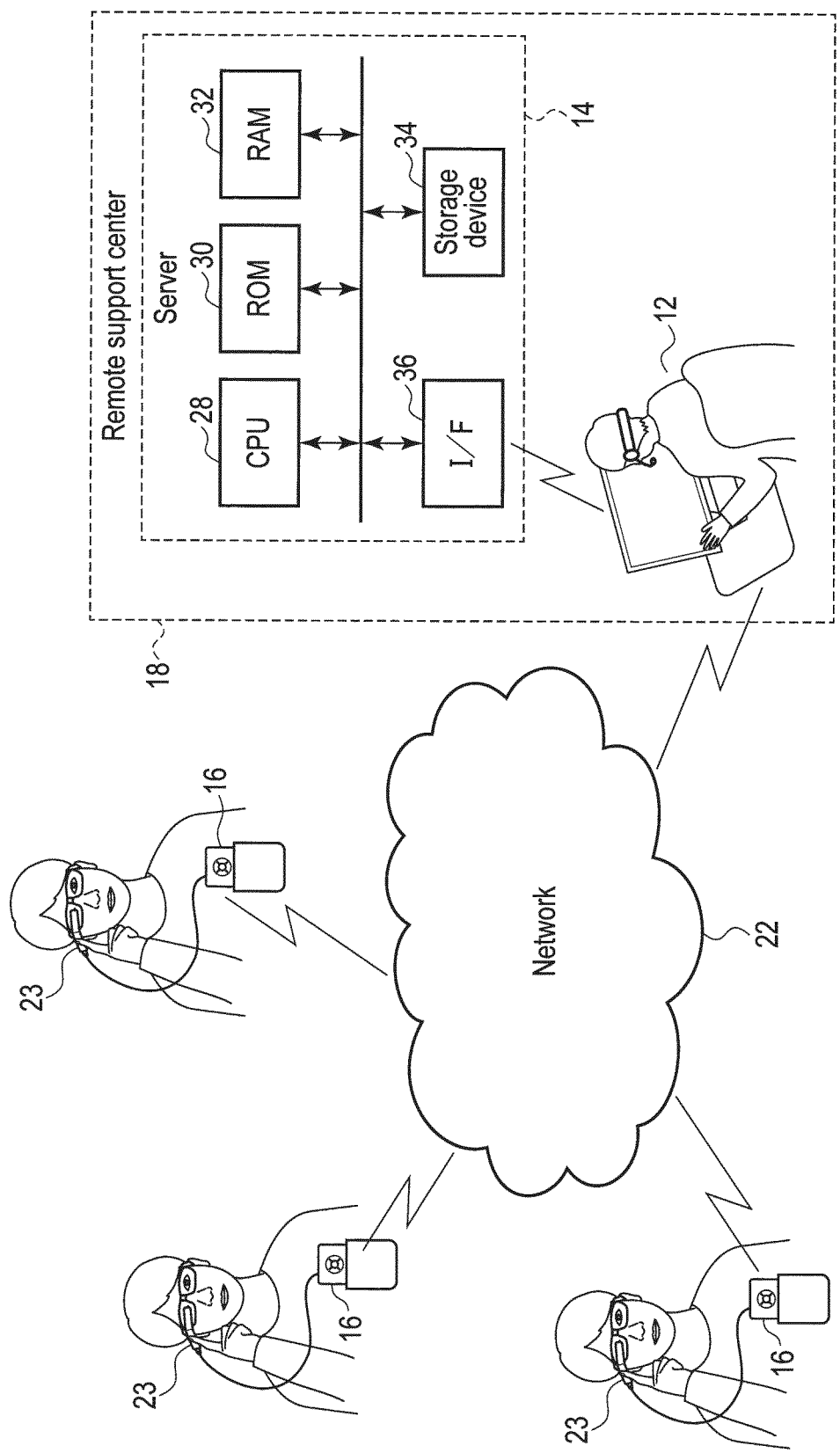
FIG. 1 is a block diagram showing an example of a remote support system including an electronic device according to an embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device comprising:

a connector connectable to an external device comprising a first device and a second device; and a hardware processor that, when the external device is connected to the connector, detects one or more devices included in the external device, performs a setup of detected one or more devices, and stores device information indicating whether the setup of each of the detected one or more devices is successful, when the electronic device is powered, when a power state of the electronic device is restored from a hibernation state or a sleep state to a normal state, or when the external device is connected to the connector, determines whether the detected one or more devices comprise the first device, and when the detected one or more devices comprise the first device and when the device information indicates that the setup of the second device included in the detected devices is not successful, repeats detection of devices included in the external device, and repeats the setup of detected devices, wherein a probability of the setup of the first device being unsuccessful is less than a probability of the setup of the second device being unsuccessful.

[Remote Support System]

FIG. 1 is a block diagram showing an example of a remote support system which is one of application examples of an electronic device according to the embodiment. The application example of the electronic device is not limited to the remote support system. The remote support system is a system configured to support the user (for example, a worker at a job site) by an operator at the rear from a remote location. Examples of field work include complicated maintenance work, picking work in a distribution warehouse, monitoring, disaster relief/medical support, and the like. The user side at the job site is also called a front end, and the operator side at the rear is also called a back end.

The remote support system is formed of a mobile PC 16 carried by the user, remote support center (data center) 18 located at a position distant from the user, and network 22 configured to connect the mobile PC 16 and remote support center 18 to each other to enable communication between them. The mobile PC 16 and the remote support center 18 may be connected to the network 22 through wired LAN cables or may be connected to the network 22 through a wireless LAN, Bluetooth (registered trade mark) or the like. The mobile PC 16 has high degrees of general versatility and processing capability which can be used at a job site. The mobile PC 16 is sometimes called a mobile edge computing device.

If the mobile PC 16 is provided with a hardware keyboard fox text input or a display, the portability is spoiled, and it is difficult for the user to concentrate on the work. In order to solve the problem, the mobile PC 16 is not provided with a display or a hardware keyboard. When an eyeglass type or a goggle type wearable device is connected to the mobile PC 16, a display section of the wearable device can be utilized as a display of the mobile PC 16, and hence the user can confirm the display while working. Thereby, it is expected that the operational efficiency is promoted and the productivity is improved at the job site or the like, or load dispersion of data and improvement in the network environment can be achieved.

A wearable device, such as an eyeglass type wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a display device, a touch pad, and the like. Accordingly, an image transmitted from the mobile PC 16 is displayed on the display, and a command or the like is input from the touch pad.

As shown in FIG. 1, it is also possible for a plurality of users to communicate with each other through the network 22. In this case, communication may also be carried out through the remote support center 18, and communication may also be carried out only between the users without being carried out through the operator of the remote support center 18.

The remote support center 18 is provided with an operator terminal 12 and a server 14. The remote support center 18 makes a voice call or information exchange between the mobile PC 16 (wearable device 23) and the operator terminal 12. It is possible to carry out video distribution of a real-time image shot by the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the wearable device 23, whereby hands-free picking can be realized.

The remote support typically includes, for example, the following functions:

A voice calls function of carrying out an interactive voice call between the mobile PC 16 and the operator terminal 12.

A live image distribution function of carrying out video distribution of a real-time image shot by the wearable device 23 to the operator terminal 12 during a voice call.

A function of carrying out transmission/reception of a still image between the mobile PC 16 and the operator terminal 12 during a voice call (The mobile PC 16 transmits a shot still image or a captured image being video-distributed to the operator terminal 12. The operator terminal 12 edits the received image by writing characters or pictures, and transmits the edited image to the mobile PC 16. The still image received by the mobile PC 16 is stored in a folder in the mobile PC 16, and can be browsed).

A screen sharing function of displaying the entire desktop screen of the operator terminal 12 or a window of an arbitrary application program on the wearable device 23 during a voice call.

A text message transmitting function of transmitting a text message from the operator terminal 12 to the mobile PC 16.

The server 14 carries out processing for remote support in place of or in cooperation with the operator terminal 12, and is provided with a hardware processor (CPU) 28, ROM 30, RAM 32, and a storage device 34 such as a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 is formed of a desktop PC, notebook PC or the like. The operator issues an instruction to the user having the mobile PC 16 with a conversation or an image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file into the operator terminal 12.

The operator terminal 12 is provided with a system controller 42 including a hardware processor. A main memory 44, a BIOS-ROM 50, a storage device 52 such as an HDD or an SSD, an audio codec 54, a graphics controller 62, a touch panel 70, a USB (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage device 52 into the main memory 44. These programs include an operating system (OS) 46, and back-end application program 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and headphones 58 may be provided singly, and may also be provided in an integrated manner as an intercom.

The graphics controller 62 controls a liquid crystal display (LCD) 64 to be used as a display monitor of the operator terminal 12. The touch panel 70 is overlaid on the screen of the LCD 64, and allows a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to an external display device (not shown).

The wireless LAN device 74 executes wireless LAN communication of the IEEE 802.11 standard for the purpose of connection to the network 22. The Bluetooth device 76 executes wireless communication of the Bluetooth standard for the purpose of connection to an external device (not shown). The wired-LAN device 78 executes wired LAN communication of the IEEE 802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal. 12 and an external device (not shown). The memory card controller 82 writes data into a storage medium (not shown), for example, a memory card such as an SD (Secure Digital) card (registered trade mark), and reads data from the memory card.

The EC/KBC 84 is a power management controller, and is realized as a one-chip microcomputer incorporating therein also a keyboard controller that controls a hardware input keyboard 88. The EC/KBC 84 has a function of setting the operator terminal 12 to a power-on state, a power-off state, a sleep state, or a hibernation state and a function of restoring the operator terminal 12 from the sleep state or the hibernation state to the normal state according to an operation of a power switch 86. Control of the power-on state, the power-off state, the sleep state, or the hibernation state is executed by cooperation between the EC/KBC 84 and a power circuit 90. Even while the operator terminal 12 is in the power-off state, the EC/KBC 84 operates by power from a battery 92 or an AC adaptor 94 (to be connected as an external electric power supply). The power circuit 90 uses the power from the battery 92 or from the AC adaptor 94 to generate the power to be supplied to each component.

[Wearable Device 23]

Figure 3:
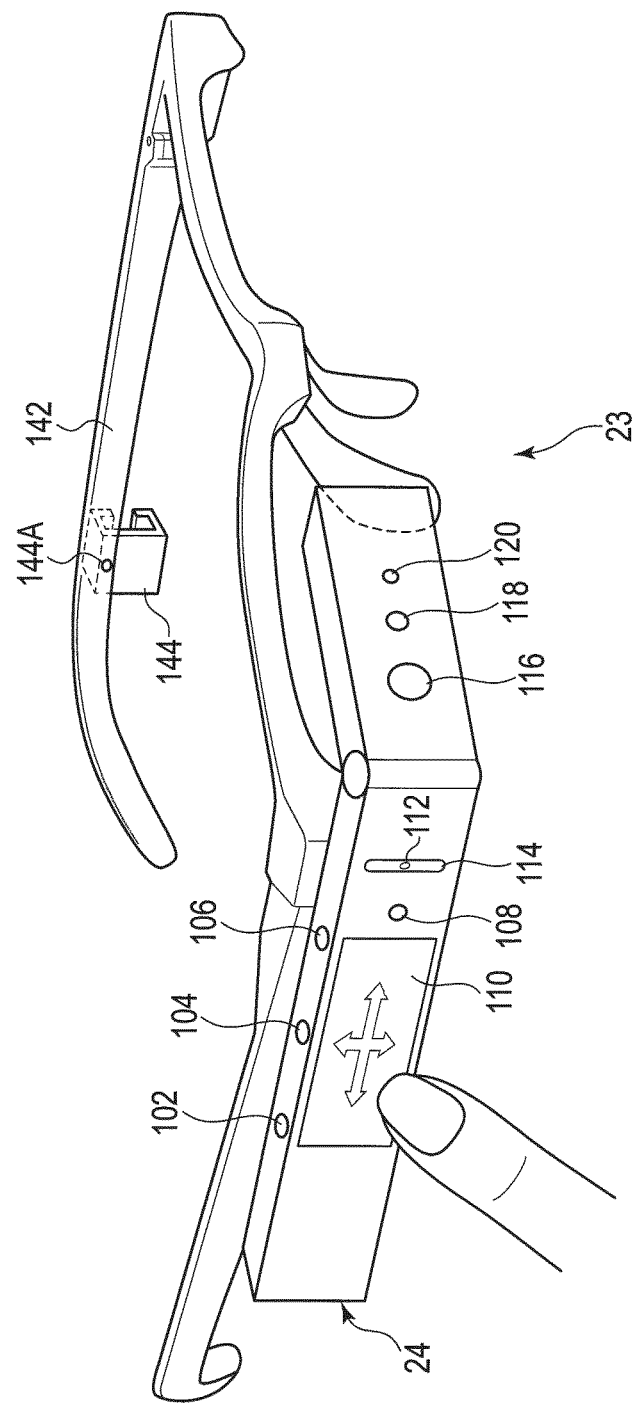
FIG. 3 is a view showing an example of an external appearance of a wearable device 23 to be connected to a mobile PC 16 in FIG. 1.

FIG. 3 shows an example of an external appearance of the wearable device 23 to be connected to the mobile PC 16. The wearable device 23 is formed of an eyeglass frame 142 and a wearable device main body 24. The eyeglass frame 142 may have a shape obtained by removing lenses from general eyeglasses and is worn on the face of the user. The eyeglass frame 142 may have a structure to which eyeglasses can be attached. When the user habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right temple or the left temple. In FIG. 3, the wearable device main body 24 is attached to the mounting bracket 144 on the right temple of the user so that the mounting bracket 144 on the right temple is hidden behind the wearable device main body 24, and hence is not shown.

Figure 4:
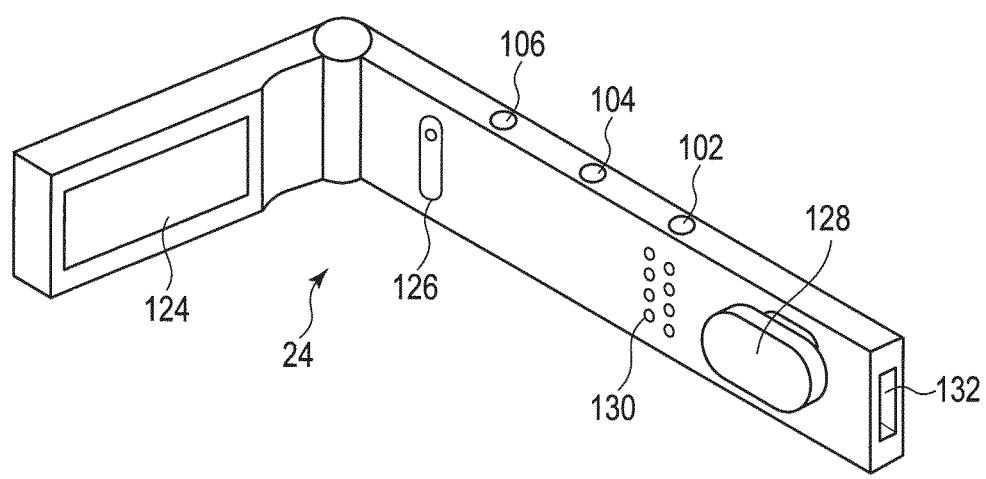
FIG. 4 is a view showing an example of an external appearance of a wearable device main body 24.

As described above, the wearable device main body 24 is provided with a display device 124 (shown in FIG. 4). The display device 124 is viewed by one eye. Therefore, the mounting brackets 144 are provided on both the right temple and the left temple so that the wearable device main body 24 can be attached to the mounting bracket on the dominant eye side. The wearable device main body 24 need not be detachably attached to the eyeglass frame 142 by means of the mounting bracket 144. The wearable device for the right eye only may be prepared in which the wearable device main body 24 is fixed to the right temple of the eyeglass frame 142. The wearable device for the left eye only may be prepared in which the wearable device main body 24 is fixed to the left temple of the eyeglass frame 142. Furthermore, the wearable device main body 24 may not be attached to the eyeglass frame 142, but may be attached to the head of the user by using a helmet or a goggle.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144. In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the user's eye can be brought to a focus on the display device 124.

Furthermore, the mounting bracket 144 is rotatable around an axis 144A perpendicular to the temple. After the wearable device main body 24 is attached to the eyeglass frame 142, the wearable device main body 24 is adjustable in the upward or the downward direction so that the display device 124 can be positioned on the user's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the user without detaching/reattaching the entire wearable device 23 from/to the face of the user.

[Wearable Device Main Body 24]

The wearable device main body 24 is formed of a side part to be along the temple of the eyeglass frame 142, and a front part to be positioned on the line of sight of one eye of the user. The angle which the front part forms with the side part is adjustable.

As shown in FIG. 3, on the outside surface of the front part, a camera 116, a light 118, and a camera LED 120 are provided. The light 118 is an auxiliary lighting fixture emitting light at the time of shooting a dark object. The camera LED 120 is turned on at the time of shooting a photograph or a video to thereby cause the objective person to be shot to recognize that he or she is to be shot.

On the top surface of the side part of the wearable device main body 24 attached to the right side temple, first, second, and third buttons 102, 104, and 106 are provided. When the dominant eye of the user is the left eye, the wearable device main body 24 is attached to the left side temple. The top and the bottom of the wearable device main body 24 are reversed according to whether the wearable main body 24 is attached to the right side temple or the left side temple. Therefore, the first, second, and third buttons 102, 104, and 106 may be provided on both the top surface and the bottom surface of the side part.

On the outside surface of the side part, a touch pad 110, a fourth button 108, a microphone 112, and an illuminance sensor 124 are provided. The touch pad 110 and the fourth button 108 can be operated by a forefinger. When the wearable device main body 24 is attached to the right side temple, the buttons 102, 104, and 106 are arranged such that the buttons 102, 104, and 106 can be operated by a forefinger, a middle finger, and a third finger, respectively. The touch pad 110 detects the movement of finger in up and down directions or back and forth directions on the surface on the touch pad 110 as indicated by arrows. The movement to be detected includes flicking of a finger for grazing the surface quickly in addition to dragging of a finger for moving the finger with the finger kept in contact with the surface. Upon detection of up-and-down or back-and-forth movement of the user's finger, the touch pad 110 inputs a command. In this description, the command implies an executive instruction to execute specific processing to be issued to the wearable device main body 24. Operation procedures for the first to fourth buttons 102, 104, 106, and 108, and the touch pad 110 are determined in advance by the application program.

For example, when the third button 106 is pressed once, item selection/item execution is carried out, when the third button 106 is pressed for a long time, a list of activated application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the hardware input keyboard) of an operation is executed.

Regarding the operation of the touch pad 110, for example, when the touch pad 110 is dragged up or down, the cursor is moved up or down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 3 is that there is no space for the fourth button 108 on the top surface. The fourth button 108 may be provided on the top surface of the side part in the same manner as the first to third buttons 102, 1.04, and 106 if the top surface has an enough space. The illuminance sensor 114 detects the illuminance of the surrounding area in order to automatically adjust the brightness of the display device 124.

FIG. 4 shows an example of an external appearance of the back side of the wearable device main body 24. On the inner side of the front part, the display device 124 is provided. On the inner side of the side part, a microphone 126, a speaker 130, and the engaging piece 128 are provided. The microphone 126 is provided at a front position of the side part, and the speaker 130 and the engaging piece 128 are provided at a rear position of the side part. Headphones may be used in place of the speaker 130. In this case, the microphone 126 and the headphones may also be provided in an integrated manner as an intercom in the same manner as the operator terminal 12.

Figure 5:
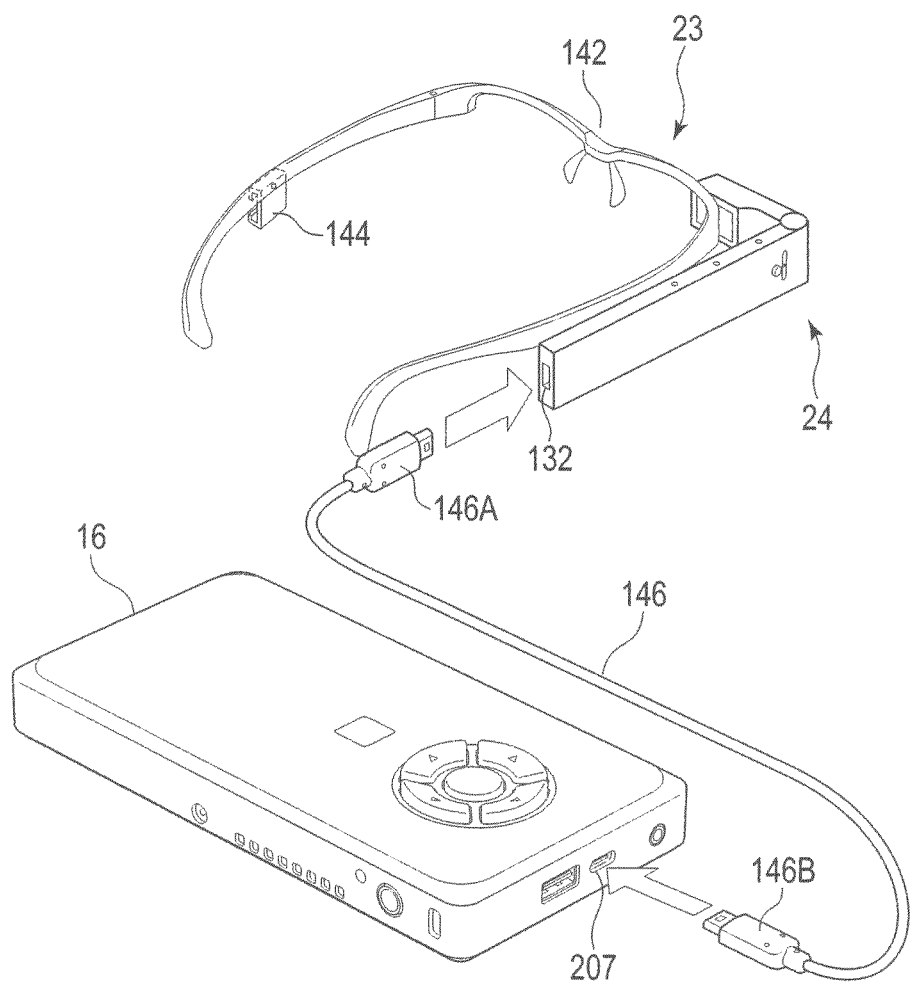
FIG. 5 is a view showing an example of connection between the mobile PC 16 and the wearable device main body 24.

FIG. 5 shows an example of connection between the mobile PC 16 and the wearable device main body 24. At a rear position of the side part, a receptacle 132 into which a plug 146A at one end of a USB type-c (registered trade mark) cable 146 conforming to the USB type-C standard is to be inserted is provided. The receptacle 132 and the plug 146A may be generally called a connector. A plug 146B at the other end of the USB type-C cable 146 is inserted into a receptacle 207 conforming to the USB type-C standard provided on an upper end face of the mobile PC 16. The receptacle 207 and the plug 146B may be generally called a connector. As described above, the wearable device main body 24 is connected to the mobile PC 16 through the USB type-C cable 146, and an image signal and the USB signal are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or a DC terminal serving as a drive power supply, and the drive power is supplied from the mobile PC 16 to the wearable device main body 24 through the USB type-C cable 146. However, the wearable device main body 24 may also be provided with a drive power supply.

Figure 6:
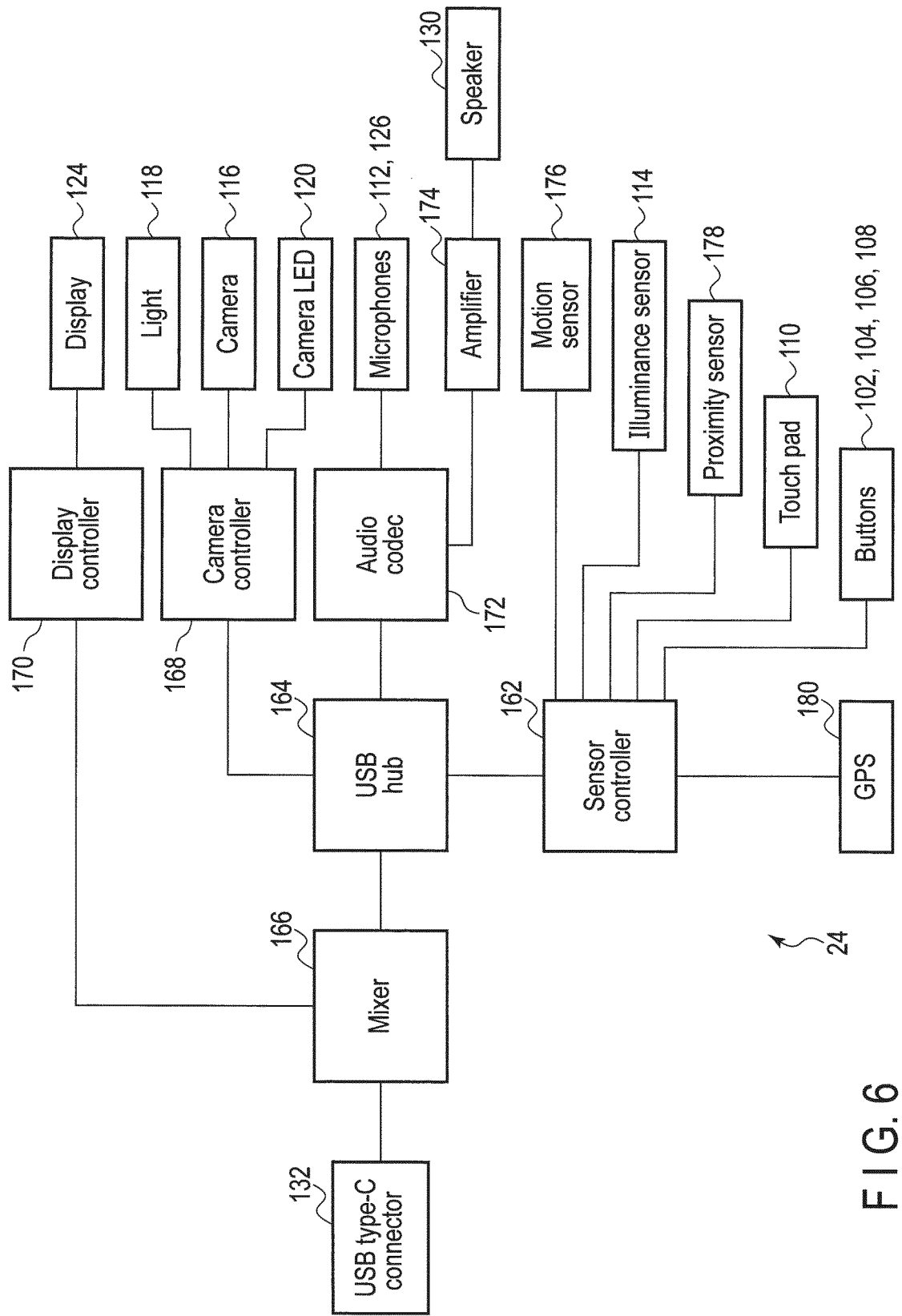
FIG. 6 is a block diagram showing an exemplary structure of the wearable device main body 24.

FIG. 6 is a block diagram showing an exemplary structure of the wearable device main body 24. The USE type-C connector 132 is connected to a mixer 166. A display controller 170 and a USE hub 164 are respectively connected to a first terminal and a second terminal of the mixer 166. The display device 124 is connected to the display controller 170. A camera controller 168, an audio codec 172, and a sensor controller 162 are connected to the USB hub 164. The camera 116, the light 118, and the camera LED 120 are connected to the camera controller 168. Audio signals from the microphones 112 and 126 are input to the audio codec 172, and an audio signal from the audio codec 172 is input to the speaker 130 through an amplifier 174. The display 124 is built-in the wearable device main body 24 in this example. An external display may be connected to the display controller 170 through a cable, such as an HDMI cable.

A camera controller 168, an audio codec 172, and a sensor controller 162 are connected to the USB hub 164. The camera 116, the light 118, and the camera LED 120 are connected to the camera controller 168. Audio signals from the microphones 112 and 126 are input to the audio codec 172, and the audio signals from the audio codec 172 are input to the speaker 130 through an amplifier 174. In the example of FIG. 6, although the camera 116, the audio codec 172, the sensor controller 162, and the like are built-in the wearable device main body 24, these devices may also be external devices. For example, a USB standard connector (receptacle) may be provided in the device main body 24, and the camera, the audio codec, the sensor controller, and other USB devices which are external devices may be connected to the USB hub 164 through a USB standard cable.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 1.04, 106, and 108, and a GPS sensor 180 are connected to the sensor controller 162. The sensor controller 162 processes detection signals from the motion sensor 176, the illuminance sensor 114, the proximity sensor 178, the touch pad 110, the first to fourth buttons 102, 104, 106 and 108, and the GPS sensor 180, and supplies a command to the mobile PC 16. Although not shown in FIG. 4, the motion sensor 176 and the proximity sensor 178 are arranged inside the wearable device main body 24. The motion sensor 176 detects a motion, a direction, a posture and the like of the wearable device main body 24. The proximity sensor 178 detects attachment of the wearable device 23 on the basis of approach of a face, a finger and the like of the user thereto.

Although the wearable device main body 24 is one device, the wearable device main body 24 is a composite device in which the plurality of devices described above are accommodated in housing.

[Mobile PC 16]

Figure 7:
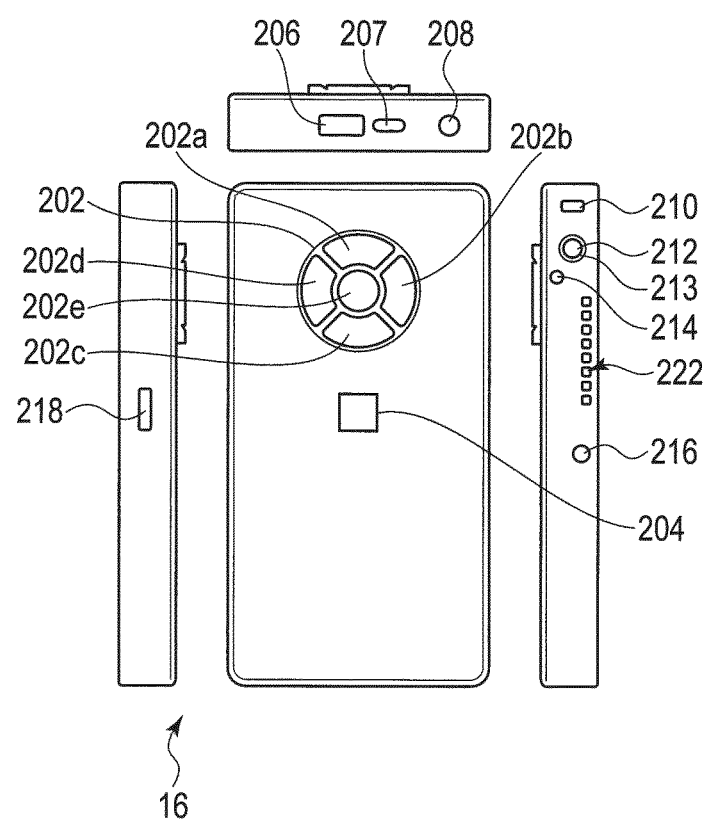
FIG. 7 is a view showing an example of an external appearance of the mobile PC 16.

FIG. 7 shows an example of an external appearance of the mobile PC 16. The mobile PC 16 is a small-sized PC that can be held by one hand, and has a small size and light weight, i.e., a width thereof is about 10 cm or less, a height thereof is about 18 cm or less, a thickness thereof is about 2 cm or less, and a weight thereof is about 300 gram or less. Accordingly, the mobile PC 16 can be held in a pocket of the work clothing of the user, a holster to be attached to a belt, or a shoulder case, and is wearable. Although the mobile PC 16 incorporates therein semiconductor chips such as a CPU, a semiconductor memory and the like, and storage devices such as an SSD and the like, the mobile PC 16 is not provided with a display device and a hardware input keyboard for inputting characters or numerals.

On the front surface of the mobile PC 16, five buttons 202 constituted of an up button 202*a*, a right button 202*b*, a down button 202*c*, a left button 202*d*, and a decision button 202*e* (also called a center button or an enter button) are arranged. A fingerprint sensor 204 is arranged below the five buttons 202. The mobile PC 16 is not provided with a hardware input keyboard for inputting characters or numerals. Thus, a password (also called a PIN) cannot be input. Therefore, the fingerprint sensor 204 is used for user authentication at the time of sign-in of the mobile PC 16. The five buttons 202 can input a command.

User authentication at the time of sign-in may be carried out by assigning numeric values or alphabets to the buttons 202*a* to 202*d* of the five buttons 202, and by inputting a password using the five buttons 202. In this case, the fingerprint sensor 204 can be omitted. Numeric values or alphabets are assigned to the four buttons 202*a* to 202*d* other than the decision button 202*e*, and the assignable number of the numeric values or alphabets is only four. Thus, there is a possibility of numeric values or alphabets input in a random manner being coincident with the password. However, by making the digit number of the password large, it is possible to make the probability that the numeric values or alphabets input in a random manner will be coincident with the password low. Authentication by the five buttons 202 may be enabled in also the mobile PC 16 provided with the fingerprint sensor 204. Although one mobile PC 16 may be shared among a plurality of users, it is not possible to cope with such a case by only the fingerprint authentication.

The operations identical to those of the buttons 102, 104, 106 and 108, and the touch pad 110 of the wearable device main body 24 can also be applied to the five buttons 202. The user cannot watch the state where the buttons 102, 104, 106 and 108, and the touch pad 110 of the wearable device main body 24 are being operated. Therefore, it may be necessary for a user to become accustomed to carrying out an intended operation depending on the user. Further, the buttons 102, 104, 106 and 108 and the touch pad 110 are small in size, and thus they may be difficult to operate. In the embodiment, the five buttons 202 of the mobile PC 16 can also be operated in the manner same as the buttons 102, 104, 106 and 108 and the touch pad 110, and hence the above-mentioned difficulty may be overcome. The operation procedures of the five buttons 202 are determined by the application program.

For example, when the decision button 202*e* is pressed once, item selection/item execution is carried out (corresponding to pressing once of the third button 106 in the wearable device main body 24), when the decision button 202*e* is pressed for a long time, ending or cancellation of an operation is carried out (corresponding to pressing once of the first button 102 in the wearable device main body 24), when the up button 202*a* is pressed once, the cursor is moved upward (corresponding to upward drag on the touch pad 110 in the wearable device main body 24), when the up button 202*a* is pressed for a long time, a list of activated application programs is displayed (corresponding to pressing the third button 106 for a long time in the wearable device main body 24), when the down button 202*c* is pressed once, the cursor is moved downward (corresponding to downward drag on the touch pad 110 in the wearable device main body 24), when the down button 202*c* is pressed for a long time, a menu of quick settings is displayed (corresponding to pressing of the second button 104 for a long time in the wearable device main body 24), when the left button 202*d* is pressed once, the right icon is selected (corresponding to backward drag/flick on the touch pad 110 in the wearable device main body 24), and when the right button 202*b* is pressed once, the left icon is selected (corresponding to forward drag/flick on the touch pad 110 in the wearable device main body 24).

On the upper side face of the mobile PC 16, a USB 3.0 connector 206, the USB type-C connector 207, and an audio jack 208 are provided.

On one side face (side face on the left side when viewed from the front) of the mobile PC 16, a memory card slot 218 for a memory card is provided. The memory card includes, for example, an SD card (registered trade mark), a micro SD card (registered trade mark), and the like.

On the other side face (side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not the battery 352 is being charged, and the remaining battery level. Although the mobile PC 16 can be driven by the battery 352, the mobile PC 16 can also be driven in the state where the AC adaptor (not shown) is connected to the DC terminal 216. Although not shown, the back side of the mobile PC 16 is configured such that the battery 352 can be replaced with a new one by a one-touch operation.

Figure 8:
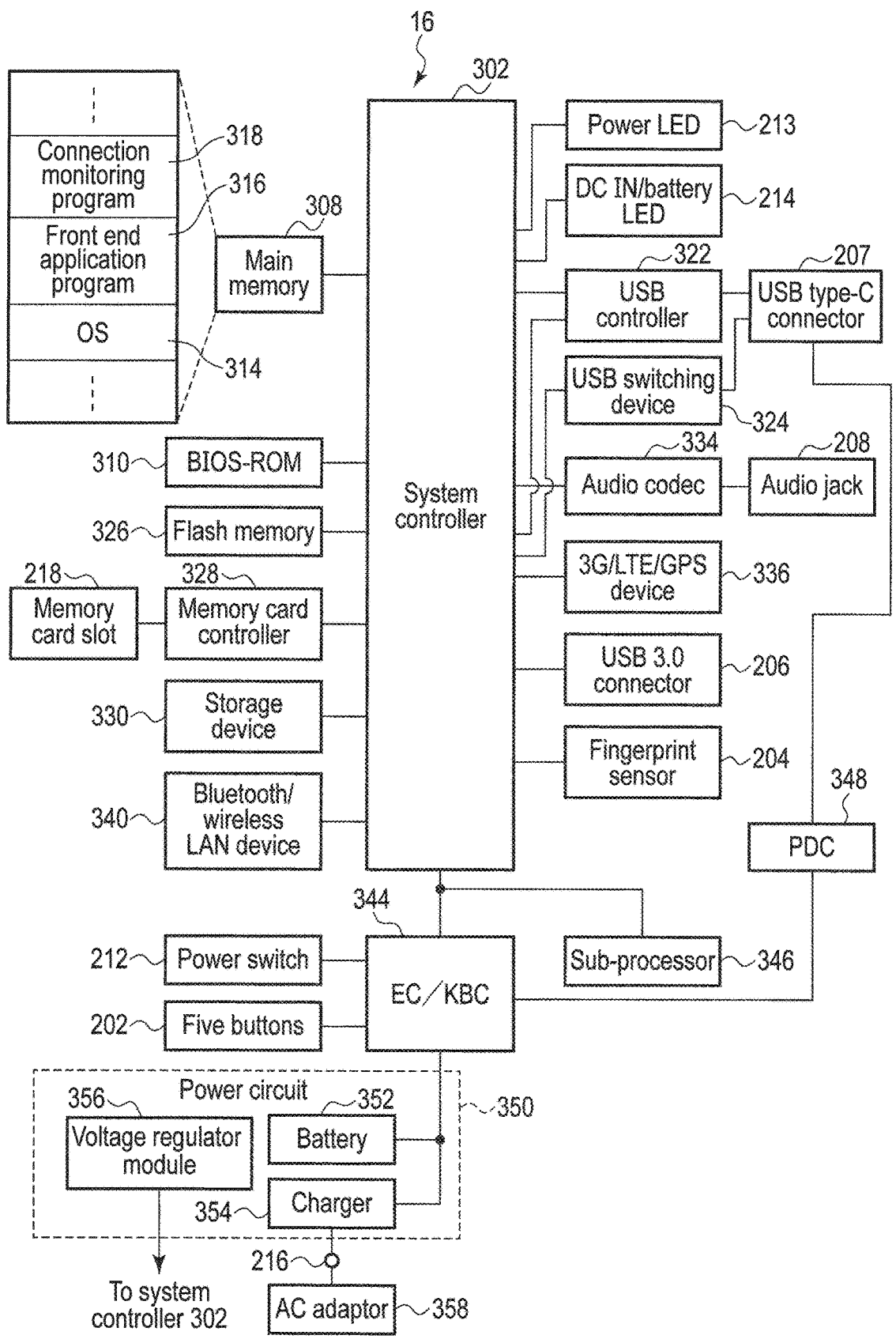
FIG. 8 is a block diagram showing an exemplary structure of the mobile PC 16.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and a viewer function. The camera function is a function of shooting a photograph or a video by means of the camera 116 of the wearable device main body 24. The shot photograph and video are stored in a camera folder (not shown) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal 12, images transmitted to the operator terminal 12, and files stored in a user folder (not shown) in the mobile PC 16.

The mobile PC 16 is provided with a system controller 302. The system controller 302 is formed of a hardware processor (CPU) and a controller/hub (not shown in FIG. 8). A main memory 308, a BIOS-ROM 310, the power LED 213, the DC IN/battery LED 214, and a USB controller 322 are connected to the hardware processor of the system controller 302. A flash memory 326, a memory card controller 328, a storage device 330 such as an HDD or an SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 316, a front-end application program 314 for remote support, a connection monitoring program 318, and the like. The connection monitoring program 318 is a program configured to, in a case where connection detection or a device setup to be carried out by the OS 314 when the wearable device main body 24 is connected to the mobile PC 16 has failed, automatically carry out detection of connection and device setup again. The system controller 302 also executes the Basic Input/Output System (BIOS) stored in the BIOS-ROM 310 which is a nonvolatile memory. The BIOS is a system program for hardware control.

The audio codec 334 converts a digital audio signal which is an object to be reproduced into an analog audio signal, and supplies the converted analog audio signal to the audio jack 208. Further, the audio codec 334 converts an analog audio signal input from the audio jack 208 into a digital signal.

The memory card controller 328 accesses to a memory card such as an SD card to be inserted into the memory card slot 218, and controls read/write of data from/to the SD card. The USB controller 322 carries out control of transmission/reception of data to/from the USB type-C cable 146 (shown in FIG. 5) connected to the USE type-C connector 207 or the USE 3.0 cable (not shown) connected to the USE 3.0 connector 206.

The Bluetooth/wireless LAN device 340 executes wireless communication conforming to the Bluetooth/IEEE 802.11 standard for the purpose of connection to the network 22. The connection to the network 22 may not depend on wireless communication, and may depend on wired LAN communication conforming to the IEEE 802.3 standard.

The fingerprint sensor 204 is used for fingerprint authentication at the time of startup of the mobile PC 16. A sub-processor 346, a USB Power Delivery Controller (called PDC) 348, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component. The power circuit 350 includes a voltage regulator module 356. The voltage regulator module 356 is connected to the hardware processor in the system controller 302.

The PDC 348 is connected the USB type-C connector 207, and carries out power-supply control for the USB type-C connector 207 according to the control from the EC/KBC 344. Upon receipt of a USB reconnection command (HCI command to be described later) from the EC/KBC 344, the PDC 348 once turns off the power supplied by the mobile PC 16 to the USB type-C connector 207, and carries out device scanning for detecting a device or devices connected to the USB type-C connector 207. The device scanning can be carried out even when the USB type-C connector 207 is not powered.

The PDC 348 carries out communication with the device detected by the device scanning to determine whether power should be supplied to the device from the mobile PC 16 or power should be supplied to the mobile PC 16 from the device. The wearable device main body 24 of the example has no power supply capability, and hence power is supplied from the mobile PC 16 to the wearable device main body 24 at all times in the example. When power is supplied from the mobile PC 16 to the wearable device main body 24, the OS 314 of the mobile PC 16 detects that the wearable device main body 24 has been connected to the mobile PC 16.

Although the mobile PC 16 is constituted as a body separate from the wearable device main body 24, the mobile PC 16 may be incorporated into the wearable device main body 24, and both of them may also be integrated into one body. Although not shown, a port extension adaptor including ports or connectors according to several interfaces can be connected also to the USB type-C connector 207, and an interface which is not provided in the mobile PC 16, such as the HDMI, RGB, wired LAN, and the like, can be used.

[Connection Monitoring Program 318]

The connection monitoring program 318 will be described below. When an external device is connected to the USB type-C connector 207 of the mobile PC 16, when the power to the mobile PC 16 is turned on, when the power state of the mobile PC 16 is restored from the hibernation state to the normal state, or when the power state of the mobile PC 16 is restored from the sleep state to the normal state, the OS 314 of the mobile PC 16 first detects, in order to make the external device connected to the USE type-C connector 207 operable, the external device connected to the USB type-C connector 207, activates a driver software corresponding to the detected external device, and sets up the external device so that the external device can become operable.

When the external device is a composite device as shown in FIG. 6, the OS 314 of the mobile PC 16 detects connection for each device, and carries out a setup for each device. In the case of the composite device, one or more devices may not be detected, driver software corresponding to the detected device may not be successfully read, or one or more devices may not be successfully set up. When there is such a composite device, although the OS 314 displays a message to the effect that there is such a composite device, the OS 314 does not automatically carry out detection of connection or setup again. The connection monitoring program 318 is prepared for the purpose of executing detection of connection or setup again in such a case. The connection monitoring program 318 is configured to carry out second detection of connection or second setup of a specific composite device, i.e., the device main body 24 shown in FIG. 6 in this case.

In order to execute the second detection or second setup, it is necessary for the connection monitoring program 318 to determine whether or not there is an undetectable device or whether or not there is a device detectable but unsuccessful in driver reading or in setup. The connection monitoring program 318 has information about the devices included in the device main body 24, and hence the connection monitoring program 318 can determine which device is not detected, which device is unsuccessful in driver reading or in setup, on the basis of a result of the setup of the device carried out by the OS 314.

Timing for determining whether or not there is such a device, i.e., timing for determining whether or not second detection or second setup should be executed may include the timing at which the OS 314 detects connection of the external device and sets up the external device. The timing includes a timing when the external device is connected to the USB type-C connector 207, a timing when the power to the mobile PC 16 is turned on, a timing when the power state of the mobile PC 16 is restored from the hibernation state to the normal state, or a timing when the power state of the mobile PC 16 is restored from the sleep state to the normal state.

The processing of determining whether or not second detection or second setup should be executed makes the operation load of the mobile PC 16 heavier according to the number of devices included in the device main body 24. Hence, it is not desirable to carry out the processing of the above determination at all the timings for all the devices included in the device main body 24. Accordingly, it is first confirmed at these timings whether or not a device serving as an essential device for connection between the mobile PC 16 and those devices, such as the USB hub 164, has been detected by the OS 314. When the OS 314 has not detected the USB hub 164, the processing of determining whether or not second detection or second setup of the device should be executed is not carried out. Only when the OS 314 has detected the USB hub 164, the processing of determining whether or not second detection or second setup of the device should be executed is carried out, whereby it is possible to restrain the processing load of the mobile PC 16.

Because the mobile PC 16 is desired to be driven by the battery 352 for as long a period of time as possible, when not operated for a fixed period of time, the mobile PC 16 is in the hibernation state. When the mobile PC 16 is in the hibernation state, the device main body 24 is also powered off. Further, when the device main body 24 is disconnected from the mobile PC 16, the device main body 24 is first in the power-off state and, thereafter the mobile PC 16 is also in the sleep state.

Furthermore, the user can change the power state of the mobile PC 16 or restore the power state to the normal state at arbitrary timing. The mobile PC 16 is provided with the five buttons 202 in place of a hardware keyboard for text input, and hence it is possible to input a command to change the power state by a combination of the buttons of the five buttons 202. Further, the mobile PC 16 is not provided with a display, and hence it is not possible to confirm the contents of the command or power state on the basis of screen display. However, the mobile PC 16 is provided with the power LED 213, and hence the mobile PC 16 can notify the user of the contents of the command or power state by changing the display color or lighting state of the power LED 213.

FIG. 9 shows examples of the power state of the mobile PC 16 changed by operating the five buttons 202. By simultaneously operating any of the power switch 212 and the five buttons 202, the power state is changed. When the power switch 212 is pressed for one second during the power-off period, the power is turned on. While the power is turned on and during the power-on period, the power LED 213 lights in a white color. When the power switch 212 is pressed for one second during the sleep state or hibernation state, the power state is restored to the normal state. While the power state is being restored from the sleep state, the power LED 213 lights in the white color. While the power state is being restored from the hibernation state, the power LED 213 lights. When the restoration is completed and the power is in the on-state, the power LED 213 lights in the white color.

When the up button 202a and the power switch 212 are simultaneously pressed for one second, the power state is shifted to the sleep state. At this time, the power LED 213 blinks. When the right button 202b and the power switch 212 are simultaneously pressed for one second, the power state is shifted to the hibernation state. At this time, the power LED 213 does not light. When the down button 202c and the power switch 212 are simultaneously pressed for one second, the power is shut down or is forcibly turned off. At this time, the power LED 213 does not light.

Figure 10:
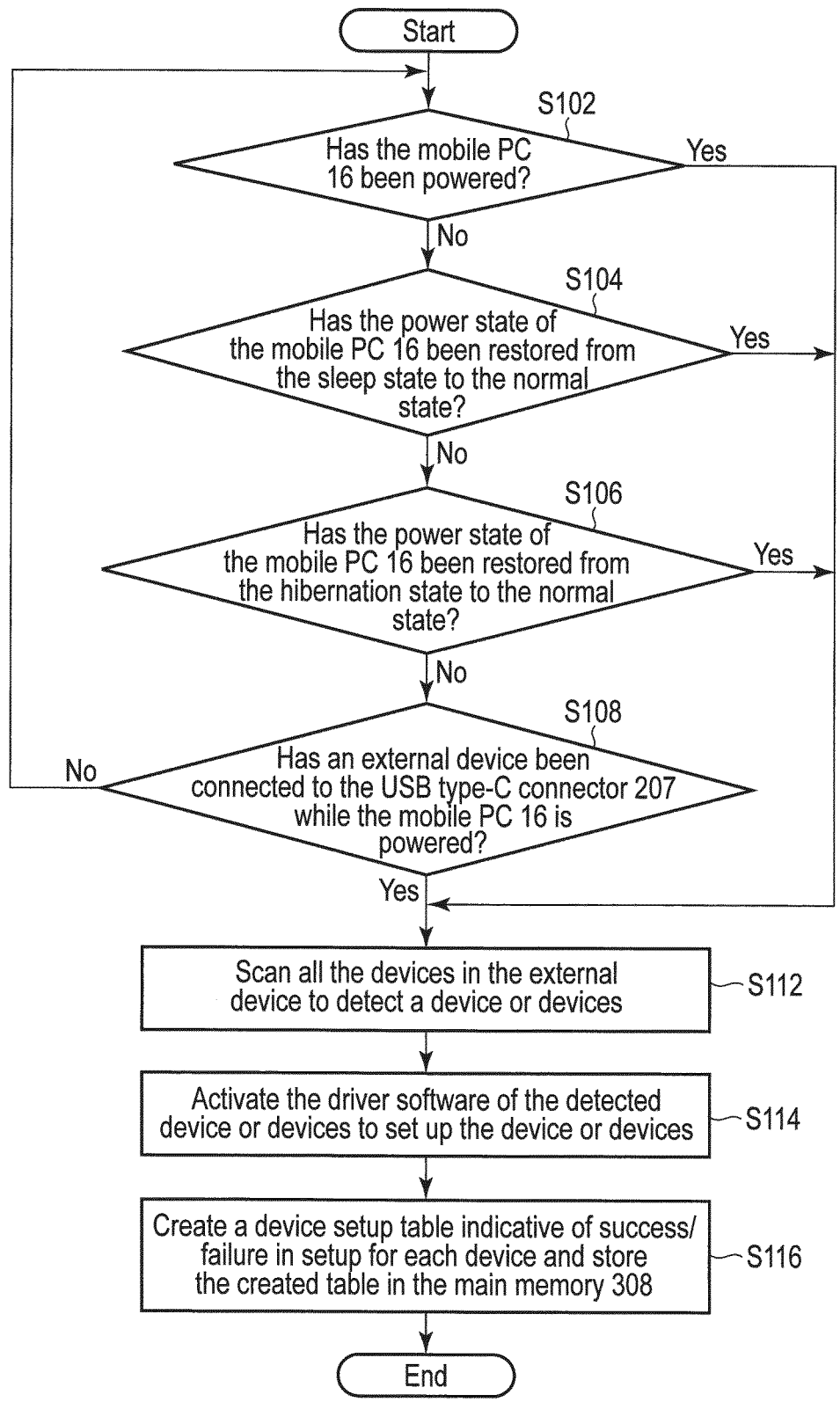
FIG. 10 is a flowchart showing an example of device detection/setup to be carried out by an OS 314 when the external device is connected to the mobile PC 16.

FIG. 10 is a flowchart showing an example of connection detection/setup processing to be executed by the OS 314 of the mobile PC 16. The OS 314 determines in step S102 whether or not the mobile PC 16 has been powered (i.e., whether or not the power state has been shifted from the off-state to the on-state). When the power state has been shifted from the off-state to the on-state, step S112 is executed. When the power state has not been shifted from the off-state to the on-state, the OS 314 determines in step S104 whether or not the power state of the mobile PC 16 has been restored from the sleep state to the normal state.

When the power state has been restored from the sleep state to the normal state, step S112 is executed. When the power state has not been restored from the sleep state to the normal state, the OS 314 determines in step 3106 whether or not the power state of the mobile PC 16 has been restored from the hibernation state to the normal state. When the power state has been restored from the hibernation state to the normal state, step S112 is executed. When the power state has not been restored from the hibernation state to the normal state, the OS 314 determines in step S108 whether or not an external device has been connected to the USB type-C connector 207 while the mobile PC 16 is powered.

When an external device has been connected to the USB type-C connector 207 while the mobile PC 16 is powered, step S112 is executed. When an external device has not been connected to the USB type-C connector 207 while the mobile PC 16 is powered, steps (S102, S104, S106, and S108) for checking transition of the power state are executed again. Connection of the external device to the USB type-C connector 207 can be detected by monitoring the voltage of the D+ terminal or D− terminal of the USB type-C connector 207. When the external device is connected to the connector 207, the voltage of the D+ terminal or D− terminal becomes, for example, 3.3 V.

The OS 314 scans in step S112 all the devices included in the external device to thereby detect a device or devices connected to the USB type-C connector 207. The OS 314 activates the driver software corresponding to the detected device or devices and carries out setups of the detected device or devices so that the detected device or devices can become operable in step S114. The OS 314 creates, in step S116, a device setup table indicative of successful/failure in setup for each device, and stores the device setup table in the main memory 308.

An example of the device setup table is shown in FIG. 11. The device setup table consists of device names of devices connections of which have been detected, and information items each of which indicates successful/failure in setup of each device. FIG. 11 shows the device setup table of a case where the device main body 24 shown in FIG. 6 is connected to the USB type-C connector 207 of the mobile PC 16.

Here, it is assumed that, among the devices included in the device main body 24, connection of each of the USB hub 164, the light 118, the camera 116, the camera LED 120, the microphones 112 and 126, the speaker 130, the motion sensor 176, the illuminance sensor 114, the proximity sensor 178, and the buttons 102, 104, 106 and 108 is detected (indicated by the device name of FIG. 11) and connection of each of the display 124, the touch pad 110, and the GPS sensor 180 is not detected (not indicated by the device name of FIG. 11).

Among the devices connections of which are detected, with respect to each of the USB hub 164, the light 118, the camera LED 120, the microphones 112 and 126, the speaker 130, the illuminance sensor 114, the proximity sensor 178, and the buttons 102, 104, 106 and 108, setup has been successful (indicated as "success" in the setup success/failure column of FIG. 11) and, with respect to each of the camera 116, and the motion sensor 176, setup has been unsuccessful (indicated as "failure" in the setup success/failure column of FIG. 11).

The OS 314 creates the device setup table, and displays the contents of the table as the need arises (displays the contents by, for example, the display 124 of the device main body 24), but does not execute second detection or second setup. The connection monitoring program 318 which is one of the application programs of the mobile PC 16 can carry out second detection or second setup by referring to the device setup table.

Figure 12:
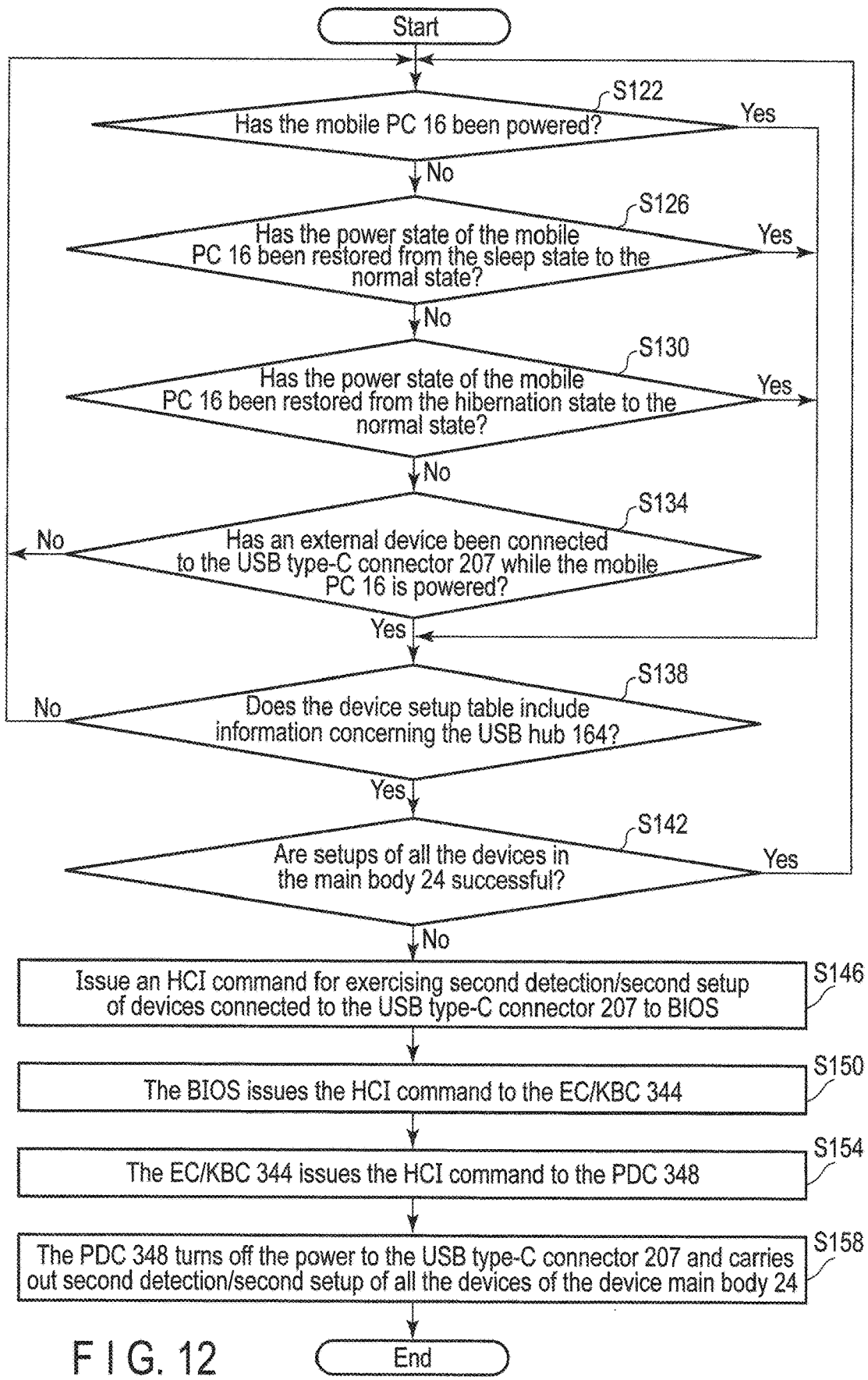
FIG. 12 is a flowchart showing an example of processing of a connection monitoring program of the mobile PC 16.

With reference to FIG. 12, an example of the processing to be carried out by the connection monitoring program 318 will be described below. The connection monitoring program 318 determines in step S122 whether or not the mobile PC 16 has been powered (i.e., the power state of the mobile PC 16 has been shifted from the off-state to the on-state).

When the power state has been shifted from the off-state to the on-state, step S138 is executed. When the power state has not been shifted from the off-state to the on-state, the connection monitoring program 318 determines in step S126 whether or not the power state of the mobile PC 16 has been restored from the sleep state to the normal state.

When the power state has been restored from the sleep state to the normal state, step S138 is executed. When the power state has not been restored from the sleep state to the normal state, the connection monitoring program 318 determines in step S130 whether or not the power state of the mobile PC 16 has been restored from the hibernation state to the normal state.

When the power state has been restored from the hibernation state to the normal state, step S138 is executed. When the power state has not been restored from the hibernation state to the normal state, the connection monitoring program 318 determines in step S134 whether or not an external device has been connected to the USB type-C connector 207 while the mobile PC 16 is powered.

When the external device has been connected to the USB type-C connector 207 while the mobile PC 16 is powered, step S138 is executed. When the external device has not been connected to the USB type-C connector 207 while the mobile PC 16 is powered, steps (S122, 3126, S130, and S134) for checking transition of the power state are executed again.

As described above, when the mobile PC 16 has been powered, when the power state of the mobile PC 16 has been restored from the sleep state to the normal state, when the power state of the mobile PC 16 has been restored from the hibernation state to the normal state, or when an external device has been connected to the USB type-C connector 207 while the mobile PC 16 is powered, step S138 is executed.

In step S138, it is determined whether or not the external device connected to the USB type-C connector 207 is the device main body 24 which is a composite device. Whether or not the external device is the device main body 24 can be determined, on the basis of whether or not the OS 314 has detected a device serving as an essential device for connection between the mobile PC 16 and those devices, i.e., the USB hub 164 in this case.

The device serving as the essential device is, among the devices included in the device main body 24, a concentrator or a relay which is positioned in the center in terms of connection, and is a device configured not to carry out complicated processing (having no controller function). A degree of a complexity of the protocol for connection detection differs from device to device, the protocol for connection detection of the USB hub 164 is on the lowest level among the devices shown in FIG. 6, and the probability that connection detection of the USB hub 164 will end in failure is the lowest.

Accordingly, when the connection of the USB hub 164 is detected, it is possible to determine that the external device connected to the USB type-C connector 207 is the device main body 24. That is, in step S138, it is determined whether or not the device setup table created by the OS 314 includes information concerning the USB hub 164. In the example of the device setup table of FIG. 11, information concerning the USB hub 164 is included in the table, and hence it is determined that the external device connected to the USB type-C connector 207 is the device main body 24.

It should be noted that it is sufficient for the connection detection of the device main body 24 if the device setup table includes information concerning the USB hub 164 and, even when a setup of the USB hub 164 has failed, it can be determined that the device main body 24 is connected to the USB type-C connector 207.

When it is determined in step S138 that the external device connected to the USB type-C connector 207 is not the device main body 24, i.e., when it is determined that the device setup table does not include information concerning the USB hub 164, steps (S122, 8126, S130, and S134) for checking transition of the power state are executed again.

When it is determined in step S138 that the external device connected to the USB type-C connector 207 is the device main body 24, i.e., when it is determined that the device setup table includes information concerning the USB hub 164, the connection monitoring program 318 determines in step S142 whether or not setups of all the devices included in the device main body 24 have been successful. The devices included in the device main body 24 are known to the connection monitoring program 318 and the connection monitoring program 318 stores a device table of the device main body 24 as shown in FIG. 13. By copying the information of the device setup table shown in FIG. 11 (created by the OS 314) into this device table, it is possible to determine presence/absence of connection detection, and success/failure in setup concerning each of all the devices included in the device main body 24.

In the example of FIG. 13, connection is not detected by the OS 314 with respect to the display 124, the touch pad 110 and the GPS sensor 180, and hence it is shown that setups of these devices are also not successful. Further, regarding the camera 116 and the motion sensor 176, it is shown that although their connections are detected, setups of these devices are not successful. As described above, in the example of FIG. 13, it is shown that it is not detected that setups of all the devices included in the device main body 24 are successful (it is detected that setup of at least one device is failed).

When it is detected in step S142 that setups of all the devices included in the device main body 24 are successful, steps (S122, S126, S130, and S134) for checking transition of the power state are executed again. When it is not detected in step S142 that setups of all the devices included in the device main body 24 are successful (it is detected that setup of at least one device is failed), the connection monitoring program 318 issues, in step S146, a Host Controller Interface (HCI) command for exercising second detection/second setup of the device main body 24 connected to the USB type-C connector 207 to the BIOS (Basic Input/Output System stored in the BIOS-ROM 310). In step S150, the BIOS issues the HCI command to the EC/KBC 344. In step S154, the EC/KBC 344 issues the HCI command to the PDC 348.

Upon receipt of the HCI command from the EC/KBC 344 in step S158, the PDC 348 once turns off the power supplied to the USB type-C connector 207 by the mobile PC 16, and carries out device scanning for detecting a device or devices connected to the USB type-C connector 207. The device scanning can be carried out even when the USB type-C connector 207 is not powered. The PDC 348 carries out communication with the device detected by the device scanning to determine whether power should be supplied to the device or power should be supplied from the device. The device main body 24 has no power supply capability, and hence power is supplied from the mobile PC 16 to the device main body 24 at all times. When power is supplied from the mobile PC 16 to the device main body 24, the OS 314 of the mobile PC 16 detects that the device main body 24 has been connected to the mobile PC 16. The connection monitoring program 318 activates drivers corresponding to the detected devices, and carries out setups of the devices again so that the devices can become operable.

It should be noted that in step S142 of FIG. 12, it is determined whether or not setups of all the devices included in the device main body 24 are successful. However, it may be determined whether or not connections of all the devices included in the device main body 24 are detected. As shown in the device table of FIG. 13, when connections of all the devices included in the device main body 24 are not detected (when connection of at least one device is undetected), it is also apparent that setups of all the devices are not successful (setup of the at least one device is failed). Accordingly, in this case, step S146 is executed.

As described above, even when the setup carried out by the OS 316 is unsuccessful, a second setup is carried out by the connection monitoring program 318. Accordingly, even when setups of some of the devices of the device main body 24 are failed, it is possible to set up the device main body 24 again without physically reconnecting the device main body 24 by the user.

Furthermore, it is not determined at all times whether or not there is the necessity of setting up the device main body 24 again and, by limiting the execution of the determination to the timing when the power to the mobile PC 16 is in the on-state, the timing when the power state of the mobile PC 16 is restored from the sleep state or hibernation state to the normal state, or the timing when the mobile PC 16 detects that an external device is connected to the USB type-C connector 207, it is possible to restrain the processing load of the mobile PC 16.

Moreover, the connection monitoring program 318 detects the connection of a device (for example, the USB hub 164) having the least likely probability of failure in connection detection to thereby determine the connection of the device main body 24, and hence the connection monitoring program 318 can securely determine the connection of the device main body 24. Consequently, the connection monitoring program 318 determines whether or not there is the necessity of setting up the device main body 24 again only when the connection of the device main body 24 is detected, and hence it is possible to further restrain the processing load of the mobile PC 16.

The processing of this embodiment can be realized by means of a computer program, and hence it is possible to easily realize an advantage identical to this embodiment by only installing this computer program into a computer through a computer-readable storage medium storing therein this computer program, and executing this computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic device comprising:
a connector connectable to an external device comprising a first device and a second device; and
a hardware processor that,
when the external device is connected to the connector, detects one or more devices included in the external device, performs a setup of detected one or more devices, and stores device information indicating whether the setup of each of the detected one or more devices is successful,
when the electronic device is powered, when a power state of the electronic device is restored from a hibernation state or a sleep state to a normal state, or when the external device is connected to the connector, determines whether the detected one or more devices comprise the first device, and
when the detected one or more devices comprise the first device and when the device information indicates that the setup of the second device included in the detected devices is not successful, repeats detection of devices included in the external device, and repeats the setup of detected devices, wherein
a probability of the setup of the first device being unsuccessful is less than a probability of the setup of the second device being unsuccessful.
2. The electronic device of claim 1, wherein
the connector comprises a USB connector, and the first device comprises a USB hub connectable to the second device.

3. The electronic device of claim 2, wherein
the second device comprise a mixer connected to the USB connector and a display connected to a first terminal of the mixer, and
the USB connector is connected to a second terminal of the mixer.

4. The electronic device of claim 1, wherein the hardware processor activates drivers corresponding to the detected one or more devices to thereby perform the setup of the detected one or more devices, and causes the device information to further indicate that the setup of the detected one or more devices failed when activation of the drivers failed.

5. The electronic device of claim 1, wherein the device information further indicates presence or absence of connection detection for each of the detected one or more devices.

6. The electronic device of claim 5, wherein, when the device information indicates the setup of the second device is not successful, the hardware processor repeats detection of devices included in the external device, and repeats the setup of detected devices.

7. The electronic device of claim 1, wherein,
when the hardware processor determines that the detected one or more devices comprise the first device, and the device information indicates that setups of all the detected devices are successful, the hardware processor determines
whether the electronic device is powered,
whether the power state of the electronic device is restored from the hibernation state or the sleep state to the normal state, and
whether the external device is connected to the connector when the power state of the electronic device is not restored from the hibernation state or the sleep state to the normal state.

8. The electronic device of claim 1, wherein, after turning off a power to the connector, the hardware processor further detects devices included in the external device, and performs the setup of detected devices.

9. The electronic device of claim 1, wherein
the first device has no controller function and has a first protocol for connection detection to the connector,
the second device has a second protocol for connection detection to the connector, and
a degree of complexity of the first protocol is lower than a degree of complexity of the second protocol.

10. The electronic device of claim 1, wherein the first device comprises a connector or a relay that makes a connection to the second device.

11. A connection method of an electronic device comprising a connector connectable to an external device comprising a first device and a second device, wherein a probability of a setup of the first device being unsuccessful is less than a probability of a setup of the second device being unsuccessful,
the method comprising:
when the external device is connected to the connector, detecting one or more devices included in the external device, performing a setup of detected one or more devices, and storing device information indicating whether the setup of each of the detected one or more devices is successful;
when the electronic device is powered, when a power state of the electronic device is restored from a hibernation state or a sleep state to a normal state, or when the external device is connected to the connector, determining whether the detected one or more devices comprise the first device; and
when the detected one or more devices comprise the first device and when the device information indicates that the setup of the second device included in the detected devices is unsuccessful, repeating detection of devices included in the external device, and repeating the setup of detected devices.

12. The method of claim 11, wherein
the connector comprises a USB connector, and
the first device comprises a USB hub connectable to the second device.

13. The method of claim 11, wherein
the first device has no controller function and has a first protocol for connection detection to the connector,
the second device has a second protocol for connection detection to the connector, and
a degree of complexity of the first protocol is lower than a degree of complexity of the second protocol.

14. The method of claim 11, wherein the first device comprises a connector or a relay that makes a connection to the second device.

15. A non-transitory computer readable storage medium comprising a plurality of executable instructions stored thereon configured to cause at least one computer of an electronic device to perform processing, wherein the electronic device comprises a connector connectable to an external device comprising a first device and a second device, wherein a probability of a setup of the first device being unsuccessful is less than a probability of a setup of the second device being unsuccessful,
the processing comprising:
when the external device is connected to the connector, detecting one or more devices included in the external device, performing a setup of detected one or more devices, and storing device information indicating whether the setup of each of the detected one or more devices is successful;
when the electronic device is powered, when a power state of the electronic device is restored from a hibernation state or a sleep state to a normal state, or when the external device is connected to the connector, determining whether the detected one or more devices comprise the first device; and
when the detected one or more devices comprise the first device and when the device information indicates that the setup of the second device included in the detected devices is unsuccessful, repeating detection of devices included in the external device, and repeats the setup of detected devices.

16. The non-transitory computer readable storage medium of claim 15, wherein
the connector comprises a USB connector, and
the first device comprises a USB hub connectable to the second device.

17. The non-transitory computer readable storage medium of claim 15, wherein
the first device has no controller function and has a first protocol for connection detection to the connector,
the second device has a second protocol for connection detection to the connector, and
a degree of complexity of the first protocol is lower than a degree of complexity of the second protocol.

18. The non-transitory computer readable storage medium of claim 15, wherein the first device comprises a connector or a relay that makes a connection to the second device.

* * * * *